United States Patent
Rasanen et al.

(10) Patent No.: US 11,558,788 B2
(45) Date of Patent: Jan. 17, 2023

(54) METHODS, APPARATUSES AND COMPUTER PROGRAM PRODUCT FOR IMPROVED SERVICE CONTINUITY WITH MOBILE EDGE COMPUTING

(71) Applicant: NOKIA SOLUTIONS AND NETWORKS OY, Espoo (FI)

(72) Inventors: John Juha Antero Rasanen, Espoo (FI); Pekka Kuure, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 199 days.

(21) Appl. No.: 16/071,773

(22) PCT Filed: Jan. 20, 2016

(86) PCT No.: PCT/EP2016/051076
§ 371 (c)(1),
(2) Date: Jul. 20, 2018

(87) PCT Pub. No.: WO2017/125143
PCT Pub. Date: Jul. 27, 2017

(65) Prior Publication Data
US 2019/0028934 A1 Jan. 24, 2019

(51) Int. Cl.
*H04W 4/00* (2018.01)
*H04W 36/00* (2009.01)
(Continued)

(52) U.S. Cl.
CPC .... *H04W 36/0027* (2013.01); *H04W 36/0011* (2013.01); *H04W 36/12* (2013.01); *H04W 80/10* (2013.01); *H04W 88/16* (2013.01)

(58) Field of Classification Search
CPC .............................................. H04W 36/0027
See application file for complete search history.

(56) References Cited

U.S. PATENT DOCUMENTS 10,440,096 B2 * 10/2019 Sabella ................. H04L 47/762
2007/0254661 A1 * 11/2007 Chowdhury .......... H04W 36/02
455/436
(Continued)

FOREIGN PATENT DOCUMENTS

CN 101355791 A 1/2009
CN 102726104 A 10/2012
(Continued)

OTHER PUBLICATIONS

International Search Report and Written Opinion dated Nov. 15, 2016 corresponding to International Patent Application No. PCT/EP2016/051076.
(Continued)

*Primary Examiner* — Guang W Li
(74) *Attorney, Agent, or Firm* — Squire Patton Boggs (US) LLP

(57) ABSTRACT

There are provided measures for improved service continuity with mobile edge computing. Such measures exemplarily comprise detecting a handover of a communication endpoint from a first gateway to a second gateway, determining, whether an ongoing mobile edge computing related application session of said communication endpoint is routed by said first gateway, checking, upon positive result of said determining, whether said ongoing mobile edge computing related application session fulfills a predetermined condition, and initiating, upon positive result of said checking, a swap of said ongoing mobile edge computing related application session from said first gateway and a first mobile edge computing entity connected to said first gateway to said second gateway and a second mobile edge computing entity connected to said second gateway.

17 Claims, 8 Drawing Sheets

(51) Int. Cl.
*H04W 36/12* (2009.01)
*H04W 80/10* (2009.01)
*H04W 88/16* (2009.01)

(56) References Cited

U.S. PATENT DOCUMENTS

| | | | |
|---|---|---|---|
| 2009/0290555 A1 | 11/2009 | Alpert et al. | |
| 2014/0003263 A1* | 1/2014 | Sheriff | H04W 80/04 370/252 |
| 2015/0032860 A1 | 1/2015 | Delangis | |
| 2017/0086049 A1* | 3/2017 | Vrzic | H04W 4/90 |
| 2018/0139654 A1* | 5/2018 | Takano | H04L 67/04 |
| 2018/0242204 A1* | 8/2018 | Zhu | H04W 36/0055 |
| 2018/0249389 A1* | 8/2018 | Zhu | H04W 36/0033 |
| 2018/0270720 A1* | 9/2018 | Shi | H04W 36/26 |
| 2018/0310350 A1* | 10/2018 | Stojanovski | H04L 61/1511 |
| 2018/0352594 A1* | 12/2018 | Iwai | H04W 76/12 |
| 2019/0373516 A1* | 12/2019 | Caldenhoven | H04W 36/12 |

FOREIGN PATENT DOCUMENTS

| | | |
|---|---|---|
| CN | 102869055 A | 1/2013 |
| CN | 103493536 A | 1/2014 |
| EP | 1811729 A2 | 7/2007 |
| WO | 2013066956 A1 | 5/2013 |

OTHER PUBLICATIONS

Communication pursuant to Article 94(3) EPC dated May 13, 2020 corresponding to European Patent Application No. 16701273.1.
Huawei Technologis France MEC(15)000252r1; Support of application and UE mobility; 2016; vol. MEC Mobile-Edge Computing Jan. 7, 2016 (Jan. 7, 2016), pp. 1-2, XP014264791, Retrieved from the Internet: URL: docbox.etsi.org\ISG\MEC\05-Contributions\2015\MEC(15)000252r1_Support_of_application_and_UE_mobil ity.docx [retrieved on Jan. 7, 2016]paragraph [0A.3].
Nokia Networks Use Case: Edge Video Orchestration; MEC(15)000071r2; 2015; vol. ISG-MEC, May 7, 2015 (May 7, 2015), pp. 1-3, XP014238797, [retrieved on May 7, 2015] paragraphs [001.], [OA.x]—[A.x.3].
Fabio Giust: NEC Europe Ltd MEC Mobility Management; 2015; vol. ISG-MEC, Jul. 14, 2015 (Jul. 14, 2015), pp. 1-10, XP014250180, [retrieved on Jul. 14, 2015] pp. 2,6-9.
ETSI Draft ETSI GS MEC 002 V0.4.2 (Jul. 2015); Mobile-Edge Computing MEC); Technical Requirements; 2015; vol. ISG-MEC, No. Vo.4.2, Jul. 31, 2015 (Jul. 31, 2015), pp. 1-41,XP014250312,[retrieved on Jul. 31, 2015 ]paragraphs [04.2]—[04.3]paragraphs [05.1], [05.4] paragraph [6.2.4] paragraphs [0A.5] paragraphs [A.10] •[A.6.3][A.10.3].
ETSI Mobile-Edge Computing—Introductory Technical White Paper; Sep. 2014; Huawei et al.
Impact on Lawful Interception of Mobile Edge Computing; LI (14) P37031_Briefing_on_Mobile_Edge_Computing; 2014; Sep. 17, 2014 (Sep. 17, 2014), pp. 1-3, XP014221081, [retrieved on Sep. 17, 2014] p. 2, line 3—p. 3, last line; figure 2.
Jul. 31, 2020 Office Action issued in Chinese Patent Application No. 201680084027.0.
"MEC Mobility Management", Fabio Giust: NEC Europe Ltd, <<MEC(15)000165_MEC_mobility_management, ETSI Draft, XP014250180>>. Jul. 14, 2015.
"Impact on Lawful Interception of Mobile Edge Computing", <<LI(14)P37031_Briefing_on_mobilie_edge_computing>>, ETSI Draft. Sep. 17, 2014.
Indian Office Action corresponding to IN Appln. No. 201817027125, dated Oct. 7, 2020.
Chinese Office Action corresponding to CN Application No. 201680084027.0, dated Jan. 19, 2021.
Chinese Decision of Rejection, with English language summary, corresponding to CN Application No. 201680084027.0, dated Jun. 10, 2021.
European Communication pursuant to Article 94(3) EPC corresponding to EP Application No. 16 701 273.1, dated Dec. 23, 2021.
Baguena Miguel et al., "Towards Enabling Hyper-Responsive Mobile Apps Through Network Edge Assistance", 2016 13th IEEE Annual Consumer Communications & Networking Conference (CCNC), Jan. 9, 2016, XP032886960, pp. 399-404.

* cited by examiner

METHODS, APPARATUSES AND COMPUTER PROGRAM PRODUCT FOR IMPROVED SERVICE CONTINUITY WITH MOBILE EDGE COMPUTING

FIELD

The present invention relates to improved service continuity with mobile edge computing. More specifically, the present invention exemplarily relates to measures (including methods, apparatuses and computer program products) for realizing improved service continuity with mobile edge computing.

BACKGROUND

The present specification generally relates to measures considering/enabling session continuity in mobile edge computing scenarios in case of handover between gateways and/or mobile edge computing entities. Mobile edge computing (MEG) is a network architecture (concept), in which applications are run and related processing tasks are performed closer to the cellular customer by pushing applications, data and computing power (services) away from centralized points to the logical extremes of a network. By running applications and performing related processing tasks closer to the cellular customer, network congestion may be reduced and applications may perform better. MEC technology is designed to be implemented at/near the cellular base stations.

MEC may support different kinds of connectivity scenarios. Applications and services offered by a MEC server may be used by $3^{rd}$ Generation Partnership Project (3GPP) mobile network users/subscribers either in sessions between a terminal (e.g. user equipment (UE)) and an MEC server or as intermediate data flow manipulators in sessions between a UE and e.g. the internet.

MEG may support different mobility scenarios. For example, a UE may move from a MEC server to another MEC server. It may be assumed that, depending on the case and/or conditions, the internet protocol (IP) address of the UE may change or stay unchanged during mobility.

MEC may work both in the forthcoming $5^{th}$ Generation (5G) environment and in the current 3GPP evolved packet core (EPC) environment. It is further conceivable that MEC may work in any future 3GPP mobile network environment.

For MEC, two architecturally different implementations may be considered. Namely, one architectural implementation with a MEG server/platform residing between the evolved NodeB (eNB, eNodeB) and Serving Gateway (S-GW)/Packet data network Gateway (P-GW), the other with the S/P-GW residing between the eNB and the MEC server/platform.

The latter implementation may be easily implementable in virtualized networks (as opposed to current non-virtualized, EPC based networks with physical S/P-GWs) and may be compatible with 5G ponderings with different levels of gateways (local, regional, central).

In a further architectural variation, the Gateway-(GW) and MEC-functionalities may be integrated in the same platform, e.g. as virtual network functions (VNF) running on the same physical platform.

Concerning the architectural implementation where the S/P-GW resides between the eNB and MEC server/platform, or the GW and MEG functionalities are integrated in the same platform, problems regarding optimal session continuity arise in mobility scenarios where a UE moves from the area of a P-GW (that has allocated an IP address from its own address range to the UE) connected to a MEC server/platform to the area of another P-GW connected to another MEC server/platform.

In particular in case the optimal session continuity requires the change of the MEC server/platform during an ongoing application session, a mere distributed mobility management and/or routing based mobility may be insufficient.

In particular, it cannot be assumed that all applications tolerate a change of an IP address during an ongoing application session. Accordingly, when a need arises to move an ongoing application session from the area of a MEC server to the area of another MEC server, further problems and complications may be caused by the uniqueness of IP addresses of MEG applications in the network.

Hence, there is a need to provide for improved service continuity with mobile edge computing.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method in a network deployment providing mobile edge computing, comprising detecting a handover of a communication endpoint from a first gateway to a second gateway, determining, whether an ongoing mobile edge computing related application session of said communication endpoint is routed by said first gateway, checking, upon positive result of said determining, whether said ongoing mobile edge computing related application session fulfills a predetermined condition, and initiating, upon positive result of said checking, a swap of said ongoing mobile edge computing related application session from said first gateway and a first mobile edge computing entity connected to said first gateway to said second gateway and a second mobile edge computing entity connected to said second gateway.

According to an exemplary aspect of the present invention, there is provided a method for terminating mobile edge computing related application sessions in a network deployment providing mobile edge computing, comprising controlling receipt of information regarding routing of downlink traffic of an ongoing mobile edge computing related application session from a first gateway via a second gateway to a communication endpoint and regarding routing of uplink traffic of said ongoing mobile edge computing related application session from said communication endpoint via said second gateway to said first gateway, and controlling transmission of information regarding said routing of said downlink traffic and said uplink traffic of said ongoing mobile edge computing related application session to a mobile edge orchestration entity.

According to an exemplary aspect of the present invention, there is provided an apparatus in a network deployment providing mobile edge computing, comprising a detecting circuitry configured to detect a handover of a communication endpoint from a first gateway to a second gateway, a determining circuitry configured to determine, whether an ongoing mobile edge computing related application session of said communication endpoint is routed by said first gateway, a checking circuitry configured to check, upon positive result of said determining circuitry, whether said ongoing mobile edge computing related application session fulfills a predetermined condition, and an initiating circuitry configured to initiate, upon positive result of said checking circuitry, a swap of said ongoing mobile edge computing related application session from said first gateway and a first mobile edge computing entity connected to said first gateway to said second gateway and a second mobile edge computing entity connected to said second gateway.

According to an exemplary aspect of the present invention, there is provided an apparatus for terminating mobile edge computing related application sessions in a network deployment providing mobile edge computing, comprising a receiving circuitry configured to control receipt of information regarding routing of downlink traffic of an ongoing mobile edge computing related application session from a first gateway via a second gateway to a communication endpoint and regarding routing of uplink traffic of said ongoing mobile edge computing related application session from said communication endpoint via said second gateway to said first gateway, and an transmitting circuitry configured to control transmission of information regarding said routing of said downlink traffic and said uplink traffic of said ongoing mobile edge computing related application session to a mobile edge orchestration entity.

According to an exemplary aspect of the present invention, there is provided an apparatus in a network deployment providing mobile edge computing, comprising means for detecting a handover of a communication endpoint from a first gateway to a second gateway, means for determining, whether an ongoing mobile edge computing related application session of said communication endpoint is routed by said first gateway, means for checking, upon positive result of said determining, whether said ongoing mobile edge computing related application session fulfills a predetermined condition, and means for initiating, upon positive result of said checking, a swap of said ongoing mobile edge computing related application session from said first gateway and a first mobile edge computing entity connected to said first gateway to said second gateway and a second mobile edge computing entity connected to said second gateway.

According to an exemplary aspect of the present invention, there is provided an apparatus for terminating mobile edge computing related application sessions in a network deployment providing mobile edge computing, comprising means for controlling receipt of information regarding routing of downlink traffic of an ongoing mobile edge computing related application session from a first gateway via a second gateway to a communication endpoint and regarding routing of uplink traffic of said ongoing mobile edge computing related application session from said communication endpoint via said second gateway to said first gateway, and means for controlling transmission of information regarding said routing of said downlink traffic and said uplink traffic of said ongoing mobile edge computing related application session to a mobile edge orchestration entity.

According to an exemplary aspect of the present invention, there is provided an apparatus in a network deployment providing mobile edge computing, the apparatus comprising at least one processor, at least one memory including computer program code, and at least one interface configured for communication with at least another apparatus, the at least one processor, with the at least one memory and the computer program code, being configured to cause the apparatus to perform: detecting a handover of a communication endpoint from a first gateway to a second gateway, determining, whether an ongoing mobile edge computing related application session of said communication endpoint is routed by said first gateway, checking, upon positive result of said determining, whether said ongoing mobile edge computing related application session fulfills a predetermined condition, and initiating, upon positive result of said checking, a swap of said ongoing mobile edge computing related application session from said first gateway and a first mobile edge computing entity connected to said first gateway to said second gateway and a second mobile edge computing entity connected to said second gateway.

According to an exemplary aspect of the present invention, there is provided an apparatus for terminating mobile edge computing related application sessions in a network deployment providing mobile edge computing, the apparatus comprising at least one processor, at least one memory including computer program code, and at least one interface configured for communication with at least another apparatus, the at least one processor, with the at least one memory and the computer program code, being configured to cause the apparatus to perform: controlling receipt of information regarding routing of downlink traffic of an ongoing mobile edge computing related application session from a first gateway via a second gateway to a communication endpoint and regarding routing of uplink traffic of said ongoing mobile edge computing related application session from said communication endpoint via said second gateway to said first gateway, and controlling transmission of information regarding said routing of said downlink traffic and said uplink traffic of said ongoing mobile edge computing related application session to a mobile edge orchestration entity.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables efficient measures depending on certain conditions of respective ongoing application sessions and transparently to the UE such that service continuity can be ensured, to thereby solve at least part of the problems and drawbacks identified in relation to the prior art.

By way of exemplary embodiments of the present invention, there is provided improved service continuity with mobile edge computing. More specifically, by way of exemplary embodiments of the present invention, there are provided measures and mechanisms for realizing improved service continuity with mobile edge computing.

Thus, improvement is achieved by methods, apparatuses and computer program products enabling/realizing improved service continuity with mobile edge computing.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) improved service continuity with mobile edge computing.

In sum, according to exemplary embodiments the gateways may first get to know whether the UE has an ongoing MEC session, whether actions are needed for the MEC session and what kind of actions are appropriate for the application, when a UE is leaving the area of a gateway and entering the area of another gateway. Then, actions may be performed to trigger the swap in the MEC environment, transparently to the UE, and preferably transparently to the application level, too, e.g. without IP address changes, unless the application tolerates IP address change.

By means of the proposed measures, session continuity upon handovers between MEC servers especially in virtualized and/or 5G environments can be enabled/improved/promoted.

Figure 1:
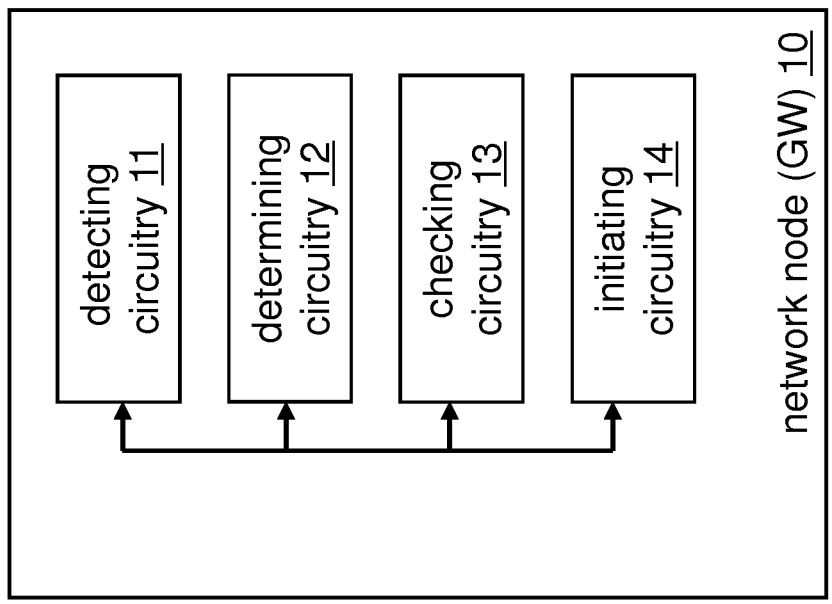
FIG. 1 is a block diagram illustrating an apparatus according to exemplary embodiments of the present invention.
Figure 4:
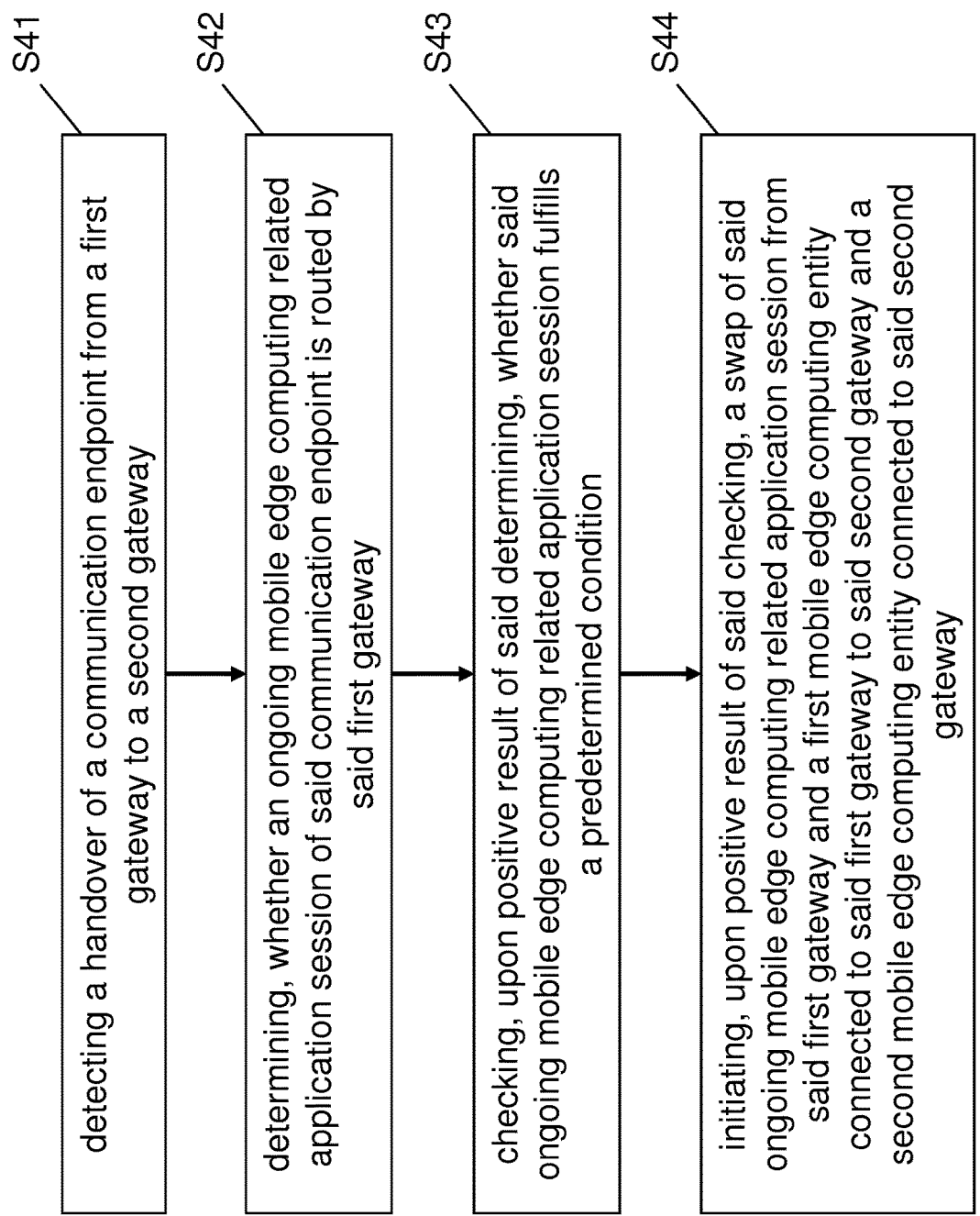
FIG. 4 is a schematic diagram of a procedure according to exemplary embodiments of the present invention.

FIG. 1 is a block diagram illustrating an apparatus according to exemplary embodiments of the present invention. The apparatus may be a network node 10 such as a gateway (e.g. S/P-GW in a network deployment providing mobile edge computing) comprising a detecting circuitry 11, a determining circuitry 12, a checking circuitry 13, and an initiating circuitry 14. The detecting circuitry 11 detects a handover of a communication endpoint from a first gateway to a second gateway. The determining circuitry 12 determines, whether an ongoing mobile edge computing related application session of said communication endpoint is routed by said first gateway. The checking circuitry 13 checks, upon positive result of said determining of the determining circuitry 12, whether said ongoing mobile edge computing related application session fulfills a predetermined condition. The initiating circuitry 14 initiates, upon positive result of said checking of the checking circuitry 13, a swap of said ongoing mobile edge computing related application session from said first gateway and a first mobile edge computing entity connected to said first gateway to said second gateway and a second mobile edge computing entity connected to said second gateway. FIG. 4 is a schematic diagram of a procedure according to exemplary embodiments of the present invention. The apparatus according to FIG. 1 may perform the method of FIG. 4 but is not limited to this method. The method of FIG. 4 may be performed by the apparatus of FIG. 1 but is not limited to being performed by this apparatus.

As shown in FIG. 4, a procedure according to exemplary embodiments of the present invention comprises an operation of detecting (S41) a handover of a communication endpoint from a first gateway to a second gateway, an operation of determining (S42), whether an ongoing mobile edge computing related application session of said communication endpoint is routed by said first gateway, an operation of checking (S43), upon positive result of said determining (S42), whether said ongoing mobile edge computing related application session fulfills a predetermined condition, and an operation of initiating (S44), upon positive result of said checking (S43), a swap of said ongoing mobile edge computing related application session from said first gateway and a first mobile edge computing entity connected to said first gateway to said second gateway and a second mobile edge computing entity connected to said second gateway.

Figure 2:
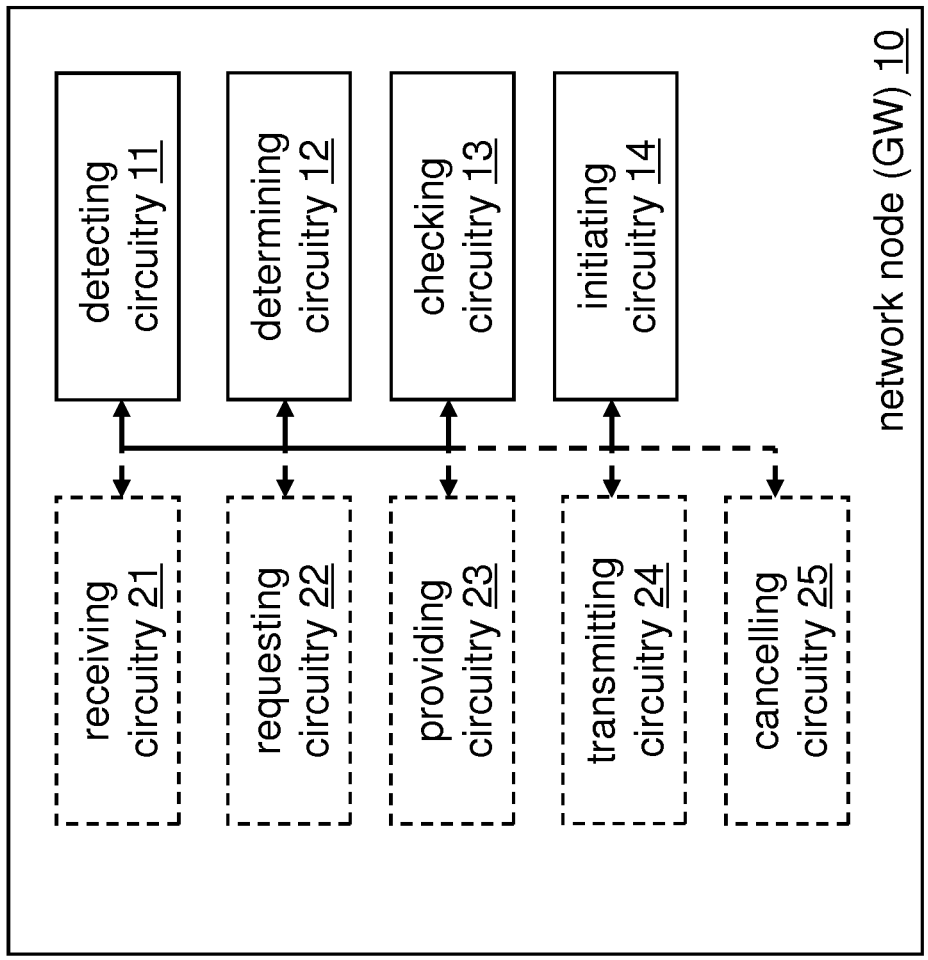
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise a receiving circuitry 21, a requesting circuitry 22, a providing circuitry 23, a transmitting circuitry 24, and a cancelling circuitry 25.

In an embodiment at least some of the functionalities of the apparatus shown in FIG. 1 or 2 may be shared between two physically separate devices forming one operational entity. Therefore, the apparatus may be seen to depict the operational entity comprising one or more physically separate devices for executing at least some of the described processes.

According to a variation of the procedure shown in FIG. 4, exemplary details of the determining operation (S42) are given, which are inherently independent from each other as such.

Such exemplary determining operation (S42) according to exemplary embodiments of the present invention may comprise an operation of controlling receipt of a handover related message indicative of an upcoming handover of said communication endpoint from said first gateway to said second gateway.

According to further exemplary embodiments of the present invention, the predetermined condition is whether said ongoing mobile edge computing related application session tolerates a change of an associated mobile edge computing entity.

According to a variation of the procedure shown in FIG. 4, exemplary additional operations are given, which are inherently independent from each other as such. According to such variation, an exemplary method according to exemplary embodiments of the present invention may comprise an operation of requesting, upon positive result of said determining (S42), routing of downlink traffic of said ongoing mobile edge computing related application session from said first gateway via said second gateway to said communication endpoint, and an operation of providing, upon positive result of said determining (S42), routing of uplink traffic of said ongoing mobile edge computing related application session from said communication endpoint via said second gateway to said first gateway.

According to a variation of the procedure shown in FIG. 4, exemplary details of the initiating operation (S44) are given, which are inherently independent from each other as such.

Such exemplary initiating operation (S44) according to exemplary embodiments of the present invention may comprise an operation of controlling transmission of information regarding said routing of said downlink traffic and said uplink traffic of said ongoing mobile edge computing related application session.

According to a variation of the procedure shown in FIG. 4, exemplary additional operations are given, which are inherently independent from each other as such. According to such variation, an exemplary method according to exemplary embodiments of the present invention may comprise an operation of controlling receipt of swap control information indicative of said swap of said ongoing mobile edge computing related application session from said first gateway and a first mobile edge computing entity connected to said first gateway to said second gateway and a second mobile edge computing entity connected to said second gateway, and an operation of cancelling, upon said receipt of said swap control information, said routing of said uplink traffic of said ongoing mobile edge computing related application session from said communication endpoint via said second gateway to said first gateway.

According to a variation of the procedure shown in FIG. 4, exemplary details of the determining operation (S42) and the checking operation (S43) are given, which are inherently independent from each other as such.

Such exemplary determining operation (S42) according to exemplary embodiments of the present invention may comprise an operation of requesting, from said first gateway, information as to whether said ongoing mobile computing related application session of said communication endpoint is routed by said first gateway. Further, such exemplary checking operation (S43) according to exemplary embodiments of the present invention may comprise an operation of requesting, from said first gateway, information as to whether said ongoing mobile edge computing related application session fulfills said predetermined condition.

According to further exemplary embodiments of the present invention, the ongoing mobile edge computing related application session is associated with an internet protocol address unique in said network deployment.

Alternatively, according to still further exemplary embodiments of the present invention, the ongoing mobile edge computing related application session is associated with an internet protocol address unique for said first mobile edge computing entity and identical for said second mobile edge computing entity.

The method may be operable at or by said second gateway in at least one of a LTE and a LTE-A cellular system (or any other 3GPP-related mobile communications system).

The communication endpoint may be a terminal, user equipment, mobile station or modem.

Both, the first gateway and the second gateway may be a respective packet data network gateway and/or serving gateway or a combination thereof.

Both, the first mobile edge computing entity and the second mobile edge computing entity may be a respective mobile edge computing server or mobile edge computing functionality.

Figure 3:
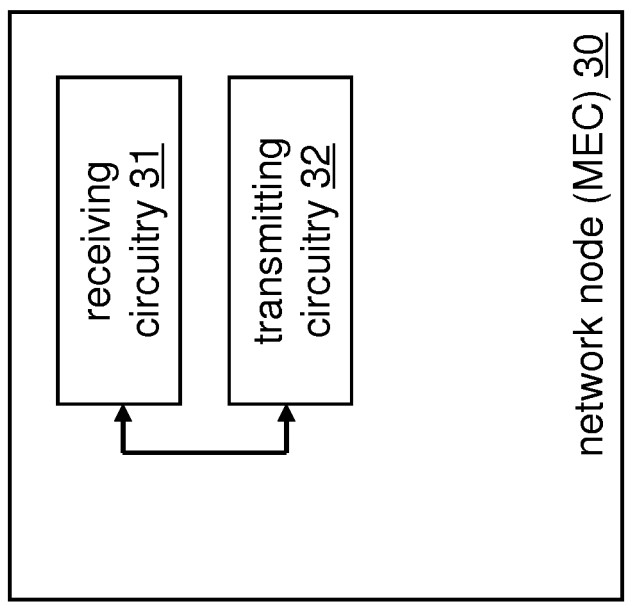
FIG. 3 is a block diagram illustrating an apparatus according to exemplary embodiments of the present invention.
Figure 5:
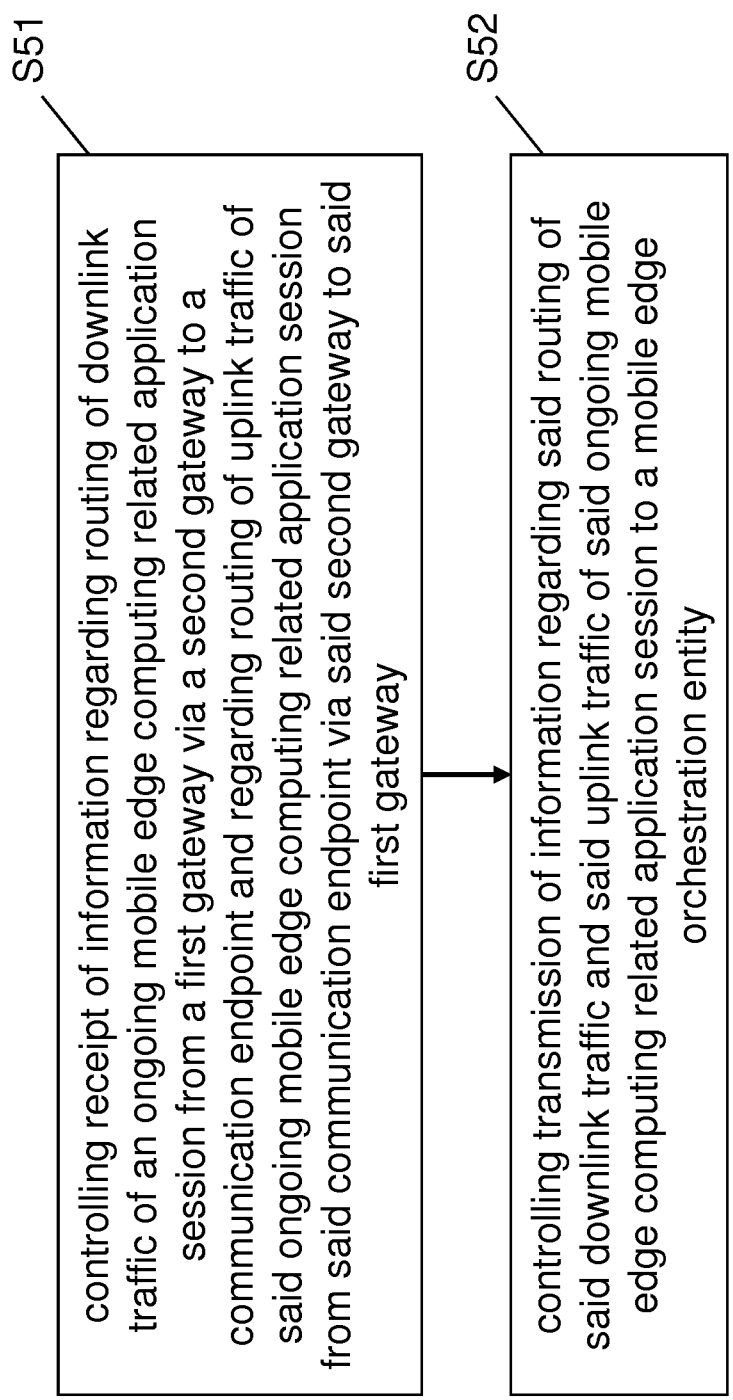
FIG. 5 is a schematic diagram of a procedure according to exemplary embodiments of the present invention.

FIG. 3 is a block diagram illustrating an apparatus according to exemplary embodiments of the present invention. The apparatus may be a network node 10 such as a mobile edge computing entity (e.g. MEC-server for terminating mobile edge computing related application sessions in a network deployment providing mobile edge computing) comprising a receiving circuitry 31 and a transmitting circuitry 32. The receiving circuitry 31 receives (controls receipt of) information regarding routing of downlink traffic of an ongoing mobile edge computing related application session from a first gateway via a second gateway to a communication endpoint and regarding routing of uplink traffic of said ongoing mobile edge computing related application session from said communication endpoint via said second gateway to said first gateway. The transmitting circuitry 32 transmits (controls transmission of) information regarding said routing of said downlink traffic and said uplink traffic of said ongoing mobile edge computing related application session to a mobile edge orchestration entity. FIG. 5 is a schematic diagram of a procedure according to exemplary embodiments of the present invention. The apparatus according to FIG. 3 may perform the method of FIG. 5 but is not limited to this method. The method of FIG. 5 may be performed by the apparatus of FIG. 3 but is not limited to being performed by this apparatus.

As shown in FIG. 5, a procedure according to exemplary embodiments of the present invention comprises an operation of controlling receipt (S51) of information regarding routing of downlink traffic of an ongoing mobile edge computing related application session from a first gateway via a second gateway to a communication endpoint and regarding routing of uplink traffic of said ongoing mobile edge computing related application session from said communication endpoint via said second gateway to said first gateway, and an operation of controlling transmission (S52) of information regarding said routing of said downlink traffic and said uplink traffic of said ongoing mobile edge computing related application session to a mobile edge orchestration entity.

In an embodiment at least some of the functionalities of the apparatus shown in FIG. 3 may be shared between two physically separate devices forming one operational entity.

Therefore, the apparatus may be seen to depict the operational entity comprising one or more physically separate devices for executing at least some of the described processes.

According to exemplary embodiments of the present invention, the information regarding said routing of said downlink traffic and said uplink traffic of said ongoing mobile edge computing related application session comprises information regarding a first mobile edge computing entity connected to said first gateway and a second mobile edge computing entity connected to said second gateway.

According to a variation of the procedure shown in FIG. 3, exemplary additional operations are given, which are inherently independent from each other as such. According to such variation, an exemplary method according to exemplary embodiments of the present invention may comprise an operation of controlling receipt of first swap control information indicative of a swap of said ongoing mobile edge computing related application session from said first gateway and said first mobile edge computing entity connected to said first gateway to said second gateway and a second mobile edge computing entity connected to said second gateway from said mobile edge orchestration entity, and an operation of controlling transmission of second swap control information based on said first swap control information and indicative of said swap of said ongoing mobile edge computing related application session to said first gateway and to said second gateway.

As already mentioned above, according to exemplary embodiments of the present invention, the ongoing mobile edge computing related application session is associated with an internet protocol address unique in said network deployment.

Further, as already mentioned above, as an alternative thereto, the ongoing mobile edge computing related application session may be associated with an internet protocol address unique for said first mobile edge computing entity and identical for said second mobile edge computing entity.

The method may be operable at or by said first mobile edge computing entity or said second mobile edge computing entity in at least one of a LTE and a LTE-A cellular system (or any other 3GPP-related mobile communications system).

Both, the first mobile edge computing entity and the second mobile edge computing entity may be a respective mobile edge computing server or mobile edge computing functionality.

Further, the communication endpoint may be a terminal, user equipment, mobile station or modem.

In addition, both the first gateway and the second gateway may be a respective packet data network gateway and/or serving gateway or a combination thereof.

The above-mentioned exemplary embodiments of the present invention are hereinafter described in more specific terms with reference to FIG. 6.

Figure 6:
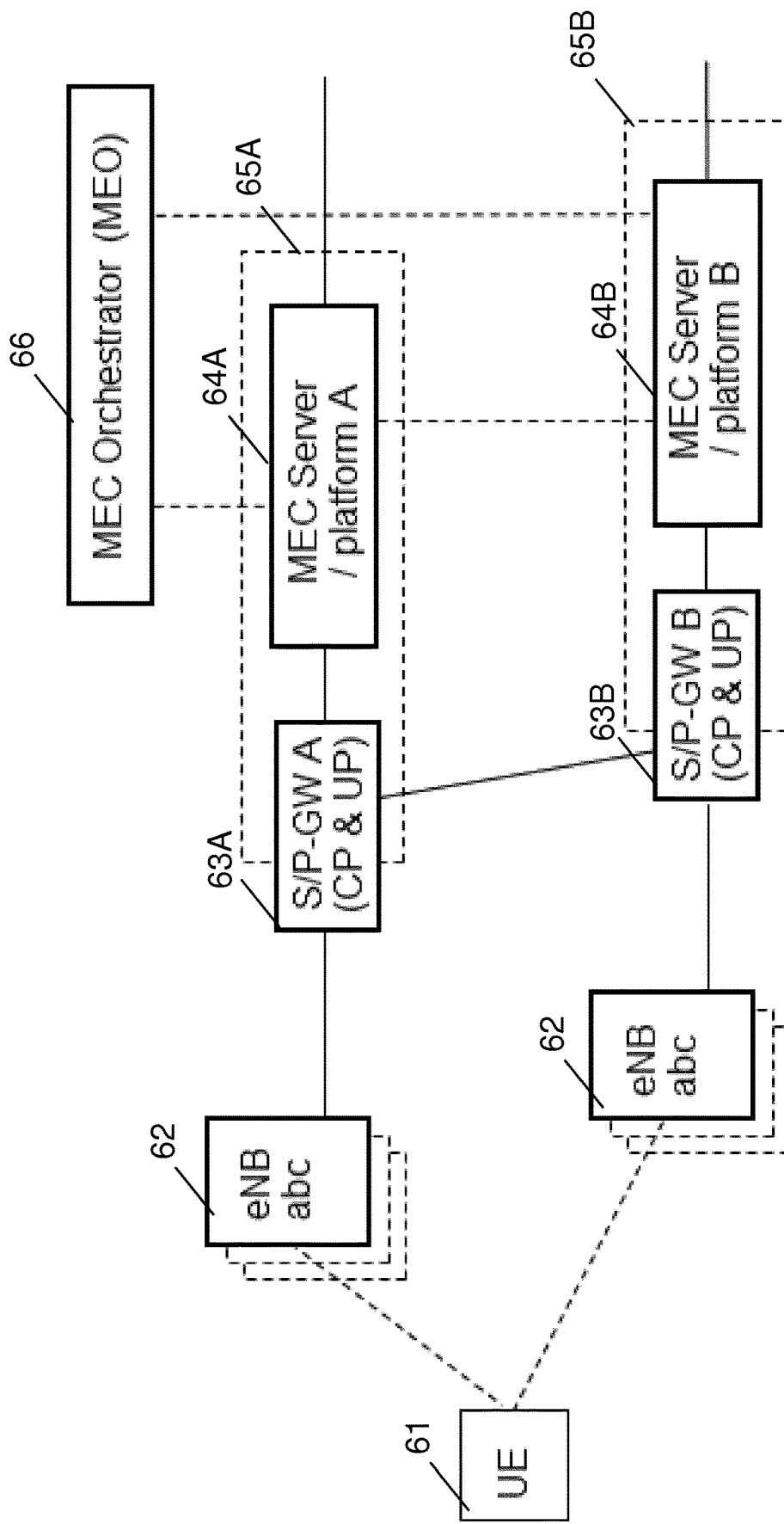
FIG. 6 shows a schematic diagram of an example of a system environment according to exemplary embodiments of the present invention.

FIG. 6 shows a schematic diagram of an example of a system environment according to exemplary embodiments of the present invention.

In particular, FIG. 6 illustrates a possible network architecture in relation to MEC, especially for a 5G or (otherwise) virtualized environment. Here, the control plane (CP) and the user plane (UP) of a GW (63A, 63B) may be integrated in the same platform (as illustrated) or separated (not shown in the FIG. 6). GW (63A, 63B) functionalities may be fully or partly integrated in the same platform with MEG (64A, 64B) functionalities (the dashed rectangle 65A, 65B) or separate in different platforms.

As is shown in FIG. 6, a terminal 61 (e.g. a UE) may be connected via an eNB 62 to an S/P-GW A (63A) or via another eNB 62 to an S/P-GW B (63B).

Further, as mentioned above, a respective S/P-GW (63A, 64A) may be connected to an associated MEG server/platform (64A, 64B) and may be integrated therewith in a combined platform (65A, 65B).

Both S/P-GWs (63A, 63B) may have an interface and may be connected to each other via such interface.

Similar thereto, both MEC entities (64A, 64B) may have an interface and may be connected to each other via such interface.

Furthermore, both MEC entities (64A, 64B) may be connected to a common MEC orchestrator 66 (MEO).

According to exemplary embodiments of the present invention, when a UE 61 sets up an application session with a MEC server (MEC-A) 64A, the gateway functionality between the eNB 62 and MEC application(s) detects the event and deduces e.g. from the address/identity of the MEC application or from the application it detects itself (e.g. from a data packet, using its traffic detection function (TDF)), that the session may experience and/or benefit from and tolerates a change of MEC server during possible mobility.

Further issues may be included in such deducing, e.g. whether the application tolerates IP address change during an ongoing session.

The application session may benefit from the change of the MEC server for example through lower latency/delay, the new MEC server being closer to the UE and/or less transmission legs and/or intermediate entities being between the UE and the new MEC server.

The mentioned information may be configured/orchestrated information in a database.

According to exemplary embodiments of the present invention, the gateway (GW-A) 63A keeps the information as long as the application session is on. The termination of the session can be detected e.g. in a similar way as the setup.

When a handover occurs from the current gateway (GW-A) 63A to another gateway (GW-B) 63B, GW-B (63B) gets a handover related message.

Such handover message may be based on (known) EPC handover procedures which apply also in virtualized environment, but is not limited thereto. Among other parameters, GW-B (63B) receives a user/UE address/identity associated with the UE 61.

Subsequently, according to the exemplary embodiments of the present invention, the GW-B (63B) deduces, e.g. from the UE's address which is in the address range of GW-A (63A), the contact details, e.g. IP address, and/or identity of GW-A (63A). GW-B (63B) finds out whether the UE 61 has an ongoing application session that may benefit from and tolerates the change of MEC server/platform, e.g. by sending a request/enquiry to GW-A (63A).

If there are no sessions at all, GW-B (63B) may for example initiate a context with the UE 61 allocating an address in its range, and inform GW-A (63A) for possible termination of the context (between the UE 61 and GW-A (63A)) that uses GW-A's address range.

If, however, such a session is found out as existing/being on, GW-B (63B) requests GW-A (63A) to route downlink traffic of UE 61 to/via GW-B (63B), and may for that purpose indicate its address or identity to GW-A (63A). Further, GW-B (63B) prepares itself to route uplink traffic of UE 61 to/via GW-A (63A).

Optionally, any existing session should or could cause the above-mentioned routing operations.

However, only sessions that are detected as benefiting from the change of the MEC server and as tolerating such change should be controlled to go through/apply the steps described in the following to move/swap the session to another MEC server.

In particular, in case there is an ongoing session that meets the server change criteria above (benefiting from; tolerating), either GW-A (63A) informs its MEC server (MEC-A) 64A, or GW-B (63B) informs its MEC server (MEC-B) 64B, about the routing arrangements for the ongoing application session of the UE 61 discussed above (routing of uplink/downlink via GW-A and GW-B), and consequently also, about the existence of the respective other GW and MEC server couple.

Then the informed MEC server initiates an orchestration (organization) of a swap of the MEG server for the UE's session, e.g. by contacting MEO 66 and sending relevant application and/or session and/or server details (identities, etc).

As a first option according to exemplary embodiments of the present invention, each MEC application has a unique IP address in the network (unique in the whole network).

However, as another option (second option), in order to maximize the benefits of the main steps according to exemplary embodiments of the present invention (e.g. routing, swapping), the following alternative addressing scenario may be applied.

Namely, according to exemplary embodiments of the present invention, each application running on a MEC server is identified by an IP address that is unique within the MEC server. The same application running on a different MEC server has the same IP address.

This option may be applied only to applications that don't tolerate/survive IP address change during an ongoing session.

Alternatively, this option may be applied to all applications supported by the MEC servers.

According to exemplary embodiments of the present invention, application specific information on the above, i.e. on whether a given application can tolerate/survive IP address change during an ongoing session and on the uniqueness of the IP address, can be stored in a database to be available e.g. to relevant gateways and/or MEC servers. A gateway and/or MEC server may use the information e.g. to deduce whether an ongoing MEC application session can be moved to another MEC server, and if yes, which measures (e.g. application level procedures due to the IP address change) are needed.

The particular benefit of the addressing scenario according to the second option is that the change of a MEC server during an ongoing session does not cause an IP address change.

Returning to the description of FIG. 6, when the application session of the UE 61 is terminated, GW-B (63B) may for example initiate a context with the UE 61 allocating an address in its range, and inform GW-A (63A) for possible termination of the context (between the UE 61 and GW-A (63A)) that uses GW-A's address range. This operation keeps the UE 61 optimally attached by releasing the IP address in the range of GW-A (63A).

Figure 7:
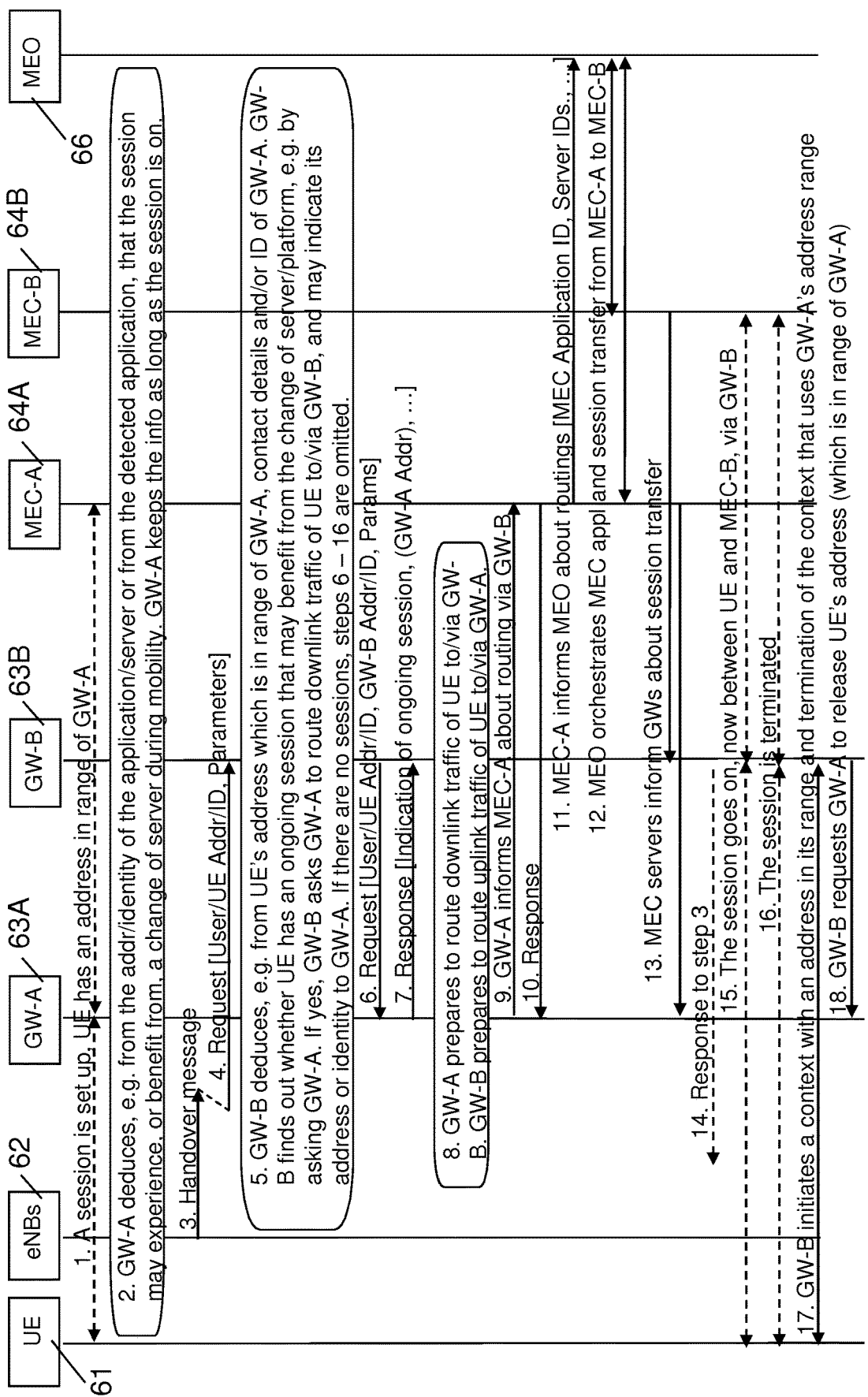
FIG. 7 shows a schematic diagram of signaling sequences according to exemplary embodiments of the present invention.

FIG. 7 shows a schematic diagram of signaling sequences according to exemplary embodiments of the present invention, and describes an exemplary embodiment of the present invention in still more specific terms.

As shown in FIG. 7, as a first signaling sequence step, a session is set up, wherein the considered UE 61 has an address in the (address) range of GW-A (63A).

In a second signaling sequence step, the GW-A (63A) deduces from e.g. the address/identity of the application/server or from the detected application, that the session may experience or benefit from, a change of a server (a MEC-server) during mobility. GW-A (63A) keeps these information as long as the session is alive.

In a third signaling sequence step, a handover message is sent from the eNB 62 serving the UE 61 to the GW-A (63A), and subsequently, in a further signaling sequence step, a request (handover related message) is transmitted from the GW-A (63A) to the (new) GW-B (63B). This request includes information regarding a user, the UE address, an identifier (ID), and further parameters.

In a fifth signaling sequence step, the GW-B (63B) deduces from e.g. the UE's address which is in the range of GW-A (63A) contact details and/or an ID of the GW-A (63A). The GW-B (63B) finds out, whether the UE 61 has an ongoing session that may benefit from the change of server/platform, e.g. by asking the GW-A (63A). If yes (such ongoing session exists), the GW-B (63B) asks GW-A (63A) to route the downlink traffic of UE 61 to/via GW-B (63B), and may indicate its address or identity to GW-A (63A). If there are no such sessions, the signaling sequence steps 6 to 16 as described below are omitted.

In the sixth and seventh signaling sequence steps, a request including information regarding the user, the UE address, an ID, the GW-B address or ID, and further parameters is transmitted from GW-B (63B) to GW-A (63A) and a corresponding response including an indication of an ongoing session and information, which may include the (user plane) IP address of GW-A (63A), is transmitted from GW-A (63A) to GW-B (63B) for the mentioned routing.

Subsequently, in the eighth signaling sequence step, the GW-A (63A) prepares to route downlink traffic of UE 61 to/via GW-B (63B), and GW-B (63B) prepares to route uplink traffic of UE to/via GW-A (63A).

In a ninth signaling sequence step, the GW-A (63A) informs the MEC-A (64A) about the routing via GW-B (63B). It should be noted that alternatively in that ninth signaling sequence step the GW-B (63B) may inform the MEC-B (64B) about the routing via GW-A (63A).

In a tenth signaling sequence step, the MEC-A (64A) responds to (acknowledges) the information transmitted in the ninth signaling sequence step to GW-A (63A). It is self-explaining that in the alternative case of the ninth signaling sequence step, in the tenth signaling sequence step the MEC-B (64B) would respond to GW-B (63B).

In an eleventh signaling sequence step, the MEC-A (64A) informs the MEO 66 about the routings, including information regarding the MEC application ID and server IDs. It is self-explaining that in the alternative case of the ninth signaling sequence step, in the eleventh signaling sequence step the MEC-B (64B) would inform the MEO 66.

In a twelfth signaling sequence step, the MEO 66 orchestrates the MEC application and session transfer (swap) from MEC-A (64A) to MEC-B (64B), i.e., transmits corresponding information to MEC-A (64A) and MEC-B (64B).

In a thirteenth signaling sequence step, the MEC servers (64A, 64B) inform the respectively corresponding GWs (63A, 63B) about the session transfer.

In a fourteenth signaling sequence step, the (new) GW-B (63B) transmits a response to the handover message transmitted in the third signaling sequence step towards the eNB 62.

In a fifteenth signaling sequence step, the session goes on (now between the UE 61 and the MEC-B (64B) via the GW-B (63B).

Further, in a sixteenth signaling sequence step, at a certain time, the session is terminated.

In a seventeenth signaling sequence step, upon termination of the session, the GW-B (63B) initiates a context with an address in its (GW-B's) range, and further initiates termination of the context that uses an address in the address range of GW-A (63A).

Finally, in an eighteenth signaling sequence step, the GW-B (63B) requests the GW-A (63A) to release the UE's address which is in the range of GW-A (63A).

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity/node (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 8:
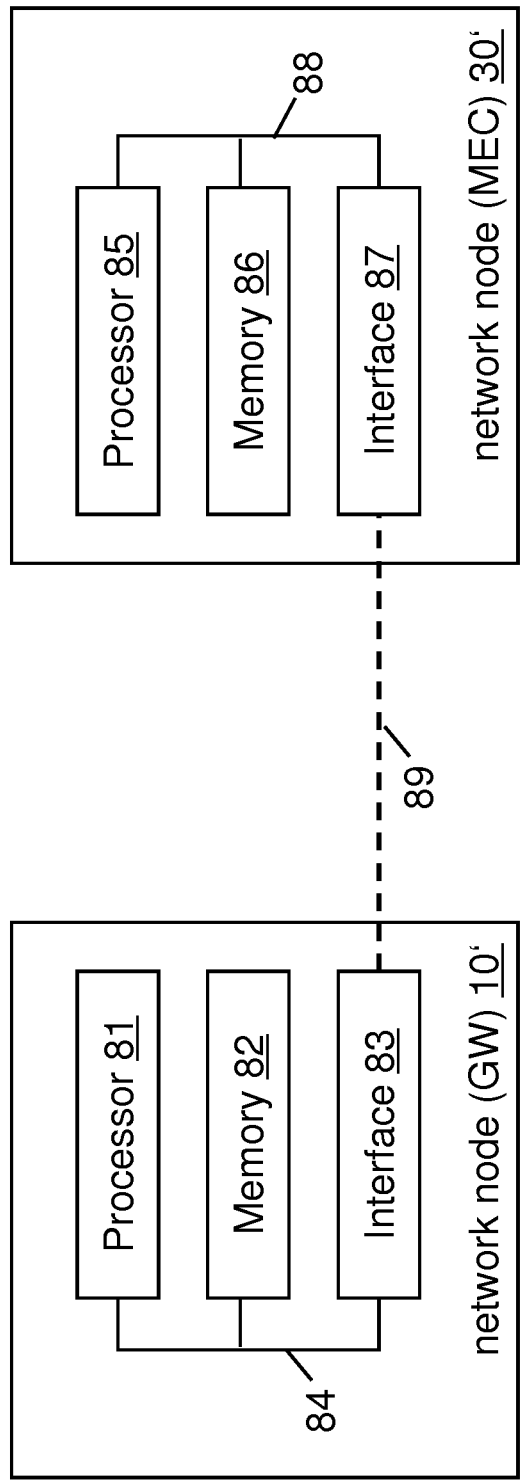
FIG. 8 is a block diagram alternatively illustrating apparatuses according to exemplary embodiments of the present invention.

In FIG. 8, an alternative illustration of apparatuses according to exemplary embodiments of the present invention is depicted. As indicated in FIG. 8, according to exemplary embodiments of the present invention, the apparatus (network node) 10' (corresponding to the network node 10) comprises a processor 81, a memory 82 and an interface 83, which are connected by a bus 84 or the like. Further, according to exemplary embodiments of the present invention, the apparatus (network node) 30' (corresponding to the network node 30) comprises a processor 85, a memory 86 and an interface 87, which are connected by a bus 88 or the like, and the apparatuses may be connected via link 89, respectively.

The processor 81/85 and/or the interface 83/87 may also include a modem or the like to facilitate communication over a (hardwire or wireless) link, respectively. The interface 83/87 may include a suitable transceiver coupled to one or more antennas or communication means for (hardwire or wireless) communications with the linked or connected device(s), respectively. The interface 83/87 is generally configured to communicate with at least one other apparatus, i.e. the interface thereof.

The memory 82/86 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network node 10 comprises at least one processor 81, at least one memory 82 including computer program code, and at least one interface 83 configured for communication with at least another apparatus. The processor (i.e. the at least one processor 81, with the at least one memory 82 and the computer program code) is configured to perform detecting a handover of a communication endpoint from a first gateway to a second gateway (thus the apparatus comprising corresponding means for detecting), to perform determining, whether an ongoing mobile edge computing related application session of said communication endpoint is routed by said first gateway (thus the apparatus comprising corresponding means for determining), to perform checking, upon positive result of said determining, whether said ongoing mobile edge computing related application session fulfills a predetermined condition (thus the apparatus comprising corresponding means for checking), and to perform initiating, upon positive result of said checking, a swap of said ongoing mobile edge computing related application session from said first gateway and a first mobile edge computing entity connected to said first gateway to said second gateway and a second mobile edge computing entity connected to said second gateway (thus the apparatus comprising corresponding means for initiating).

Further, according to exemplary embodiments of the present invention, an apparatus representing the network node 30 comprises at least one processor 85, at least one memory 86 including computer program code, and at least one interface 87 configured for communication with at least another apparatus. The processor (i.e. the at least one processor 85, with the at least one memory 86 and the computer program code) is configured to perform controlling receipt of information regarding routing of downlink traffic of an ongoing mobile edge computing related application session from a first gateway via a second gateway to a communication endpoint and regarding routing of uplink traffic of said ongoing mobile edge computing related application session from said communication endpoint via said second gateway to said first gateway (thus the apparatus comprising corresponding means for controlling/receiving), and to perform controlling transmission of information regarding said routing of said downlink traffic and said uplink traffic of said ongoing mobile edge computing related application session to a mobile edge orchestration entity (thus the apparatus comprising corresponding means for controlling/transmitting).

For further details regarding the operability/functionality of the individual apparatuses, reference is made to the above description in connection with any one of FIGS. 1 to 7, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for improved service continuity with mobile edge computing. Such measures exemplarily comprise detecting a handover of a communication endpoint from a first gateway to a second gateway, determining, whether an ongoing mobile edge computing related application session of said communication endpoint is routed by said first gateway, checking, upon positive result of said determining, whether said ongoing mobile edge computing related application session fulfills a predetermined condition, and initiating, upon positive result of said checking, a swap of said ongoing mobile edge computing related application session from said first gateway and a first mobile edge computing entity connected to said first gateway to said second gateway and a second mobile edge computing entity connected to said second gateway.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP $3^{rd}$ Generation Partnership Project
5G $5^{th}$ Generation
CP control plane
eNB evolved NodeB, eNodeB
EPC evolved packet core
GW gateway
ID identifier, identity
IP internet protocol
LTE Long Term Evolution
LTE-A Long Term Evolution Advanced
MEC mobile edge computing
MEO mobile edge orchestrator
MME mobility management entity
P-GW Packet data network Gateway
S-GW Serving Gateway
TDF traffic detection function
UE user equipment
UP user plane
VNF virtual network function

The invention claimed is:

1. A method in a network deployment providing mobile edge computing, said method comprising:
   detecting a handover of a communication endpoint from a first gateway to a second gateway by controlling receipt of a handover related message indicative of an upcoming handover of said communication endpoint from said first gateway to said second gateway, wherein the handover related message comprises indications of a user;

determining, whether an ongoing mobile edge computing related application session of said communication endpoint is routed by said first gateway;

checking, upon positive result of said determining, whether said ongoing mobile edge computing related application session fulfills a predetermined condition; and initiating, upon positive result of said checking, a swap of said ongoing mobile edge computing related application session from said first gateway and a first mobile edge computing entity connected to said first gateway to said second gateway and a second mobile edge computing entity connected to said second gateway.

2. The method according to claim 1, wherein said predetermined condition is whether said ongoing mobile edge computing related application session tolerates a change of an associated mobile edge computing entity.

3. The method according to claim 1, further comprising: requesting, upon positive result of said determining, routing of downlink traffic of said ongoing mobile edge computing related application session from said first gateway via said second gateway to said communication endpoint; and providing, upon positive result of said determining, routing of uplink traffic of said ongoing mobile edge computing related application session from said communication endpoint via said second gateway to said first gateway.

4. The method according to claim 3, wherein in relation to said initiating, said method further comprises controlling transmission of information regarding said routing of said downlink traffic and said uplink traffic of said ongoing mobile edge computing related application session.

5. The method according to claim 4, further comprising: controlling receipt of swap control information indicative of said swap of said ongoing mobile edge computing related application session from said first gateway and a first mobile edge computing entity connected to said first gateway to said second gateway and a second mobile edge computing entity connected to said second gateway; and cancelling, upon said receipt of said swap control information, said routing of said uplink traffic of said ongoing mobile edge computing related application session from said communication endpoint via said second gateway to said first gateway.

6. The method according to claim 1, wherein in relation to said determining, said method further comprises requesting, from said first gateway, information as to whether said ongoing mobile edge computing related application session of said communication endpoint is routed by said first gateway; and in relation to said checking, said method further comprises requesting, from said first gateway, information as to whether said ongoing mobile edge computing related application session fulfills said predetermined condition.

7. The method according to claim 1, wherein said ongoing mobile edge computing related application session is associated with an internet protocol address unique in said network deployment, or said ongoing mobile edge computing related application session is associated with an internet protocol address unique for said first mobile edge computing entity and identical for said second mobile edge computing entity.

8. The method according to claim 1, wherein the method is performed at or by said second gateway, or the method is performed in at least one of a LTE and a LTE-A cellular system, or said communication endpoint is a terminal, user equipment, mobile station or modem, said first gateway is a first packet data network gateway or a first serving gateway, or said second gateway is a second packet data network gateway or a second serving gateway, or said first mobile edge computing entity is a first mobile edge computing server or first mobile edge computing functionality, or said second mobile edge computing entity is a second mobile edge computing server or second mobile edge computing functionality.

9. A computer program product embodied on a non-transitory computer-readable medium, said product comprising computer-executable computer program code which, when the program is run on a computer, is configured to cause the computer to carry out the method according to claim 1.

10. An apparatus in a network deployment providing mobile edge computing, comprising:
a detecting circuitry configured to detect a handover of a communication endpoint from a first gateway to a second gateway by controlling receipt of a handover related message indicative of an upcoming handover of said communication endpoint from said first gateway to said second gateway, wherein the handover related message comprises indications of a user;
a determining circuitry configured to determine, whether an ongoing mobile edge computing related application session of said communication endpoint is routed by said first gateway;
checking circuitry configured to check, upon positive result of said determining circuitry, whether said ongoing mobile edge computing related application session fulfills a predetermined condition; and
initiating circuitry configured to initiate, upon positive result of said checking circuitry, a swap of said ongoing mobile edge computing related application session from said first gateway and a first mobile edge computing entity connected to said first gateway to said second gateway and a second mobile edge computing entity connected to said second gateway.

11. An apparatus in a network deployment providing mobile edge computing, the apparatus comprising:
at least one processor;
at least one memory including computer program code; and
at least one interface configured for communication with at least another apparatus;
the at least one processor, with the at least one memory and the computer program code, being configured to cause the apparatus to perform
detecting a handover of a communication endpoint from a first gateway to a second gateway by controlling receipt of a handover related message indicative of an upcoming handover of said communication endpoint from said first gateway to said second gateway, wherein the handover related message comprises indications of a user,
determining, whether an ongoing mobile edge computing related application session of said communication endpoint is routed by said first gateway,
checking, upon positive result of said determining, whether said ongoing mobile edge computing related application session fulfills a predetermined condition, and
initiating, upon positive result of said checking, a swap of said ongoing mobile edge computing related application session from said first gateway and a first mobile edge computing entity connected to said first gateway to said second gateway and a second mobile edge computing entity connected to said second gateway.

12. The apparatus according to claim 11, wherein said predetermined condition is whether said ongoing mobile edge computing related application session tolerates a change of an associated mobile edge computing entity.

13. The apparatus according to claim 11, wherein the at least one processor, with the at least one memory and the computer program code, are configured to cause the apparatus to perform: requesting, upon positive result of said determining, routing of downlink traffic of said ongoing mobile edge computing related application session from said first gateway via said second gateway to said communication endpoint, and providing, upon positive result of said determining, routing of uplink traffic of said ongoing mobile edge computing related application session from said communication endpoint via said second gateway to said first gateway.

14. The apparatus according to claim 13, wherein in relation to said initiating, the at least one processor, with the at least one memory and the computer program code, are configured to cause the apparatus to perform: controlling transmission of information regarding said routing of said downlink traffic and said uplink traffic of said ongoing mobile edge computing related application session.

15. The apparatus according to claim 14, wherein the at least one processor, with the at least one memory and the computer program code, are configured to cause the apparatus to perform: controlling receipt of swap control information indicative of said swap of said ongoing mobile edge computing related application session from said first gateway and a first mobile edge computing entity connected to said first gateway to said second gateway and a second mobile edge computing entity connected to said second gateway, and cancelling, upon said receipt of said swap control information, said routing of said uplink traffic of said ongoing mobile edge computing related application session from said communication endpoint via said second gateway to said first gateway.

16. The apparatus according to claim 11, wherein in relation to said determining, the at least one processor, with the at least one memory and the computer program code, being configured to cause the apparatus to perform requesting, from said first gateway, information as to whether said ongoing mobile edge computing related application session of said communication endpoint is routed by said first gateway, and in relation to said checking, the at least one processor, with the at least one memory and the computer program code, being configured to cause the apparatus to perform requesting, from said first gateway, information as to whether said ongoing mobile edge computing related application session fulfills said predetermined condition.

17. The apparatus according to claim 11, wherein said ongoing mobile edge computing related application session is associated with an internet protocol address unique in said network deployment, or said ongoing mobile edge computing related application session is associated with an internet protocol address unique for said first mobile edge computing entity and identical for said second mobile edge computing entity.

* * * * *